United States Patent [19]
Hullot et al.

[11] Patent Number: 5,146,556
[45] Date of Patent: Sep. 8, 1992

[54] SYSTEM AND METHOD FOR MANAGING GRAPHIC IMAGES

[75] Inventors: Jean-Marie Hullot, Palo Alto; Steven P. Jobs, Woodside; Christopher M. Franklin, Saratoga, all of Calif.

[73] Assignee: NeXT Computer, Inc., Redwood City, Calif.

[21] Appl. No.: 660,905

[22] Filed: Feb. 27, 1991

Related U.S. Application Data

[63] Continuation of Ser. No. 256,764, Oct. 11, 1988, abandoned.

[51] Int. Cl.$^5$ ............................................. G06F 15/40
[52] U.S. Cl. ................................. 395/159; 395/155; 340/706
[58] Field of Search ....................... 364/518, 521, 522; 340/706, 747, 731, 734, 750; 395/155, 159

[56] References Cited

U.S. PATENT DOCUMENTS

| | | | |
|---|---|---|---|
| 4,649,499 | 3/1987 | Sutton et al. | 364/518 |
| 4,656,603 | 4/1987 | Dunn | 364/900 |
| 4,813,013 | 3/1989 | Dunn | 364/900 |
| 4,839,822 | 6/1989 | Dormand et al. | 364/513 |

OTHER PUBLICATIONS

Myers, B. A. "The User Interface for Sapphire" Dec. 1984 IEEE CG9A, pp. 13-23.
Myers, B. A. "Window Interfaces"—Sep. 1988 IEEE CG9A pp. 65-84.
R. A. Bolt et al., "Spatial Data-Management," Massachusetts Institute of Technology, 1979.
Claris Corporation, MacDraw II manual, 1988, pp. 44, 45 and 137.
D. A. Henderson, Jr. et al., "Rooms: The Use of Multiple Virtual Workspaces to Reduce Space Contention in a Window-Based Graphical User Interface," *ACM Transactions on Graphics*, vol. 5, No. 3, Jul. 1986, pp. 211-243.
Xerox Corporaton, "Office Systems Technology: A Look into the World of the Xerox 8000 Series Products," 1982.
Sismilich, R. C. et al., "Interactive Computer Graphics for Manual Instrument Control," *Hewlett-Packard Journal*, vol. 37, No. 5, (May 1986), pp. 17-26.

*Primary Examiner*—Gary V. Harkcom
*Assistant Examiner*—Phu K. Nguyen
*Attorney, Agent, or Firm*—Laurence S. Rogers; Jeffrey H. Ingerman

[57] ABSTRACT

A graphic user interface for a computer is provided in which representations of application programs can be placed on the display in a specified area reserved for such a purpose in which area they could not be so readily obscured and forgotten, and which includes a facility for controlling the placement of such representations within the reserved area. The graphic images are guided into specific locations, or "docks" in the reserved area, and their removal from the docks is restricted to prevent accidental withdrawal.

54 Claims, 4 Drawing Sheets

SYSTEM AND METHOD FOR MANAGING GRAPHIC IMAGES

CROSS REFERENCE TO RELATED APPLICATION

This application is a continuation of copending U.S. patent application Ser. No. 07/256,764, filed Oct. 11, 1988, now abandoned.

BACKGROUND OF THE INVENTION

This invention relates to computers having graphically-oriented user interfaces. More particularly, this invention relates to a system and method for managing graphic images on the display of such a computer.

Computer systems are known in which the operating system provides a graphic interface with the computer user. The user can run application programs, manipulate files, and perform substantially all other functions needed by the average user by manipulating graphic images on the computer's display, either by using cursor control keys and other keyboard keys or by using a cursor controlling peripheral device such as a joystick, "mouse," or track ball.

In such systems, when a program is loaded into the system it is frequently represented on the display by a small graphic image which identifies the program to the user. For example, a word processing program might be represented by a graphic image of a piece of paper having lines of text on it and a writing instrument such a pencil or quill pen writing on the page. This is particularly so if the program is running in the background—e.g., on a multi-tasking computer—but has been removed from the screen. On a multi-tasking computer, several programs can be running at once, each of which would be represented by its own graphic image.

In addition to representing loaded programs, whether running or not, by these small graphic images, graphic interfaces represent programs and data in "windows" on the display. The windows can be moved around the display by the user, who can also adjust their size. In a multi-tasking computer system, in which several different programs can be running simultaneously, each program can have several windows, including a master, or menu, window, whose location but not size is adjustable, and one or more data windows both the size and location of which can be adjusted, representing, in a word processor for example, the document or documents being worked on. Windows can overlap and obscure one another, although the user has some control over which windows appear in front of which other windows.

If the number of windows on a display becomes too great, the user may choose to remove some or all of them from the display to unclutter the display. For instance, the windows associated with a particular program may be removed, and replaced by a graphic image representing the still-running program. Alternatively, the user might choose to remove from the display only certain data windows associated with one application, in which case the windows will be replaced by one or more small graphic images representing the fact that that data is in use. These graphic images, if subject to being covered over by windows remaining on the screen, might become "lost" or forgotten by the user, but the amount of computer resources consumed by keeping the forgotten data in place when it may no longer be necessary is small. However, if a user decides to remove an entire application with all its associated windows from the screen, and those windows become covered and forgotten, a relatively large amount of computer resources might consumed in continuing to run an application program that is no longer being used. In addition, if a graphic image representing a program that is not running is covered and forgotten, a large amount of system memory might be occupied which otherwise could be used in another application.

Therefore, it would be desirable to be able to provide a graphic user interface for a computer in which representations of application programs could be placed on the display in a specified region reserved for such a purpose in which area they could be readily accessed and not so readily obscured and forgotten.

It would also be desirable to be able to provide in such an interface a facility for controlling the placement of such representations within the reserved region.

SUMMARY OF THE INVENTION

It is an object of this invention to provide a graphic user interface for a computer in which representations of application programs can be placed on the display in a specified region reserved for such a purpose in which region they can be readily accessed and not so readily obscured and forgotten.

It is also an object of this invention to provide in such an interface a facility for controlling the placement of such representations within the reserved region.

In accordance with this invention, there is provided, in a computer system having a visual display on which application programs are represented by graphic images, which graphic images are capable of being moved within boundaries of the display and of being overlaid by window and other images displayed on the visual display, a graphic image display control system having means for moving the graphic images within the boundaries, means for providing within the boundaries a region for parking the graphic images, and means for controlling entry, responsive to movement of the graphic image by the moving means, of a graphic image into the parking region. The system also provides limitations on the withdrawal of the graphic images from the parking region.

A method by which the system operates is also provided.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
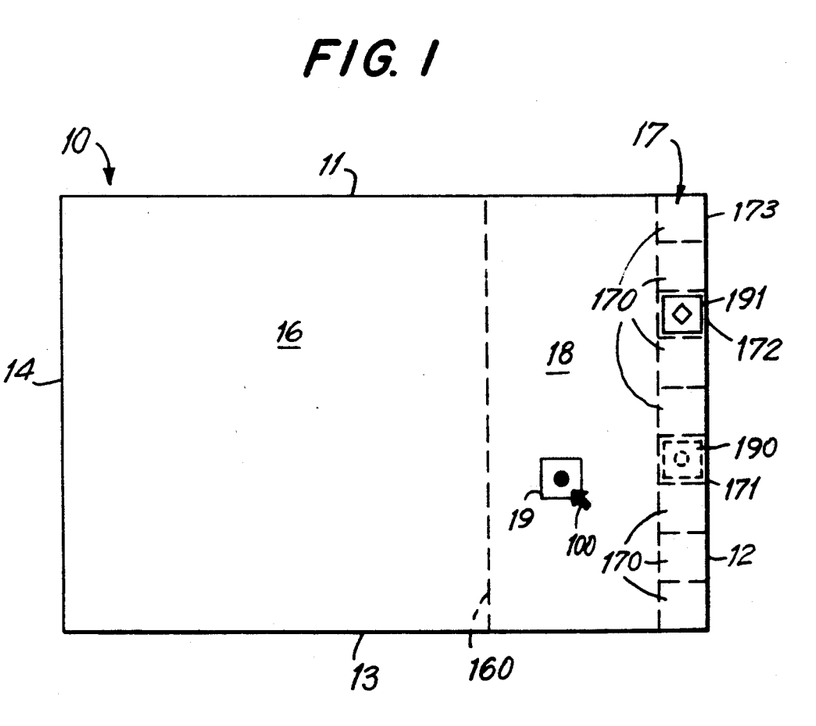
FIG. 1 is a representation of a computer display showing various regions defined thereon according to the present invention.

FIG. 1 is a diagrammatic representation of a computer display divided into regions according to an exemplary embodiment of the present invention. Display 10 (e.g., a cathode-ray tube monitor) has boundaries 11, 12, 13, 14 and is divided by the system (invisibly to the user) into a free-dragging region 16, a parking or "docking" region 17, and a retention or "gravity" region 18 between free-dragging region 16 and docking region 17. Docking region 17 is divided by the system up into individual receptacles or "docks" 170, each the size of a graphic image. A user can move various windows and graphic images around display 10 in known ways. For example, in a system employing a mouse, the user with the mouse moves a pointer 100 on the display to a graphic image to be moved, presses and holds a button or "ear" on the mouse, drags the graphic image to the desired location by moving the mouse while holding down the button, and releases the graphic image when the desired location is reached by releasing the button.

If graphic image 19 is in free-dragging region 16, it can be moved anywhere within that region and it can be moved across border 160 into gravity region 18. Once a graphic image such as graphic image 19 enters gravity region 18, if the user lets go of it by releasing the mouse button, it will be drawn by the system into one of docks 170 in docking region 17. The dock into which it will be drawn is that empty one of docks 170 with which it is most closely vertically aligned. For example, graphic image 19 is most closely vertically aligned with dock 171, and that is the dock into which it is drawn upon release of the mouse button. The user is informed of the particular dock to which graphic image 19 will be drawn upon release of the mouse button by the appearance in that dock of a "ghost" image 190 of graphic image 19. In the exemplary embodiment of the invention, ghost image 190 is a pale version of graphic image 19, but any other type of image may be used to serve the function of ghost image 190.

Ghost image 190 appears in one of docks 170 as long as a graphic image 19 which has been moved into gravity region 18 has not been docked or returned to free-dragging region 16. If the dock 192 with which graphic image 19 is aligned is occupied by another graphic image 191, ghost image 190 appears in the last empty dock 170 with which graphic image 19 was aligned until graphic image 19 is moved vertically to a position substantially aligned with a new empty dock 170 (e.g., the horizontal projection of graphic image 19 onto docking region 17 overlaps more than one half of new empty dock 170). At that time, ghost image 190 will appear in the new empty dock 170. If there is no substantially aligned available position, ghost image 190 appears in the dock position closest to graphic image 19. Wherever ghost image 190 appears, graphic image 19 will move automatically to the location of and replace ghost image 190 when the mouse button is released. This automatic movement is referred to herein as "gravity." If the mouse button is not released, graphic image 19 can be moved anywhere within parking region 17 or gravity region 18, or across border 160 back into free-dragging region 16.

If a user so desires, graphic image 19 can be moved into dock 171 by the user, rather than being moved there automatically by gravity. This manual docking is accomplished by holding the mouse button and moving the graphic image 19 toward dock 171. Graphic image 19 can be moved in gravity region 18 vertically as well as horizontally—thereby changing that one of docks 170 that will become the destination dock 171. Vertical movement of graphic image 19 is allowed even when graphic image 19 begins to overlap docking region 17, but graphic image 19 will "slide behind" any other graphic images in other docks 170, so that it may not be visible for a time until it reaches another empty dock 170. Of course, as explained above, ghost image 190 will remain in the last empty dock 170 until graphic image 19 is substantially aligned with a new empty dock 170.

Thus, as explained above, a user can move graphic image 19 freely into, around, and out of docking region 17 and gravity region 18 as long as the mouse button is not released. However, once a user docks graphic image 19 by releasing the mouse button either in a dock or anywhere in gravity region 18 while ghost image 190 appears in an empty dock 170, graphic image 19 is docked automatically by gravity. An extension of the gravity effect is a hysteresis-type effect according to which a graphic image, once docked, cannot be withdrawn from its dock 171 unless the user with the mouse points to docked graphic image 19, presses the mouse button, and moves the pointer a predetermined distance from its initial position. Preferably, the predetermined distance is less than the width or height of graphic image 19—e.g., 10-12 pixels—to minimize abrupt, discontinuous movement of graphic image 19, although the predetermined distance may be any desired distance. However, once pointer 100 is moved the predetermined distance, assuming the mouse button has been held continuously, graphic image 19 will jump to the position of pointer 100. This hysteresis prevents inadvertent undocking of graphic image 19 in case the user unintentionally presses the mouse button before moving pointer 100 out of dock 171 immediately after docking. Furthermore, it is also possible to lock a graphic image in a dock 170, so that it cannot be undocked without going through additional steps to unlock it. In some cases, the computer system may control the locking and unlocking of graphic images, rather than the user. For example, in the preferred embodiment a graphic image representing the operating system (not shown) is locked in the first dock 173.

In the preferred embodiment, graphic images docked in docking region 17 cannot be overlaid by windows of application programs still appearing on the screen. Thus, a docked graphic image 19 of an application program cannot be forgotten as it might be if the graphic image were left in a random position on display 10. Although it is possible to implement the system of the invention so that some or all docked graphic images can be obscured by at least some types of windows, the location of graphic image 19 in docking region 17 still would make it less likely that graphic image 19 will be forgotten.

Although graphic image 19 is originally introduced into gravity region 18 and docking region 17 from free-dragging region 16, in the preferred embodiment if graphic image 19 is returned to free-dragging region 16 after having been in gravity region 18 or docking region 17, it is automatically removed from display 10. Of course, it can be recalled by the user when desired.

Alternatively, the invention could be implemented so that once returned to free-dragging region 16, graphic image 19 always remains visible and can be moved to any desired location by the user.

Although it is often desirable that docked graphic images in docking region 17 always appear on display 10, there may be occasions when a user would like to clear display 10 for a particular application. For example, the user may be running a graphics application that requires a display having an aspect ratio equal to that of the full area of display 10, or the user may be running a large spreadsheet program and would like to have as many columns visible as possible. For whatever reason a user may want to remove docking region 17 from display 10, the preferred embodiment of the present invention allows such removal in part. According to the preferred embodiment, a portion of docking region 17—and docked graphic images—can be moved off display 10. In the preferred embodiment, this is accomplished by using the mouse to move the operating system graphic image (referred to above) which is locked into docking region 17. Because the operating system graphic image is locked, it cannot be removed from docking region 17. Thus any attempt to move it moves the entire docking region 17 and all other docked images. Docking region 17 in the preferred embodiment is along one edge of display 10 as shown, and movement of docking region 17 as just described is limited to translation along that edge. The maximum translation allowed is that which leaves only the operating system graphic image in dock 173 visible on display 10, so that the user is at least reminded that docking region 17 exists, hopefully prompting the user to check the contents of docking region 17 periodically.

It is not necessary to implement the invention so that docking region 17 is moved by the operating system graphic image. For example, it may be possible to use any locked graphic image to move docking region 17. Alternatively, it may be possible to use any graphic image to move docking region 17. However, whatever the implementation, the user preferably should not be allowed to move docking region 17 so far off display 10 that no docked graphic images are visible. At least the first occupied dock 170 preferably should be visible (the actual first dock 173 might be empty). Further, if the only visible graphic image is not locked, the invention preferably should be implemented in such a way that if that graphic image is removed from docking region 17, the next occupied dock 170 moves onto display 10.

Figure 2:
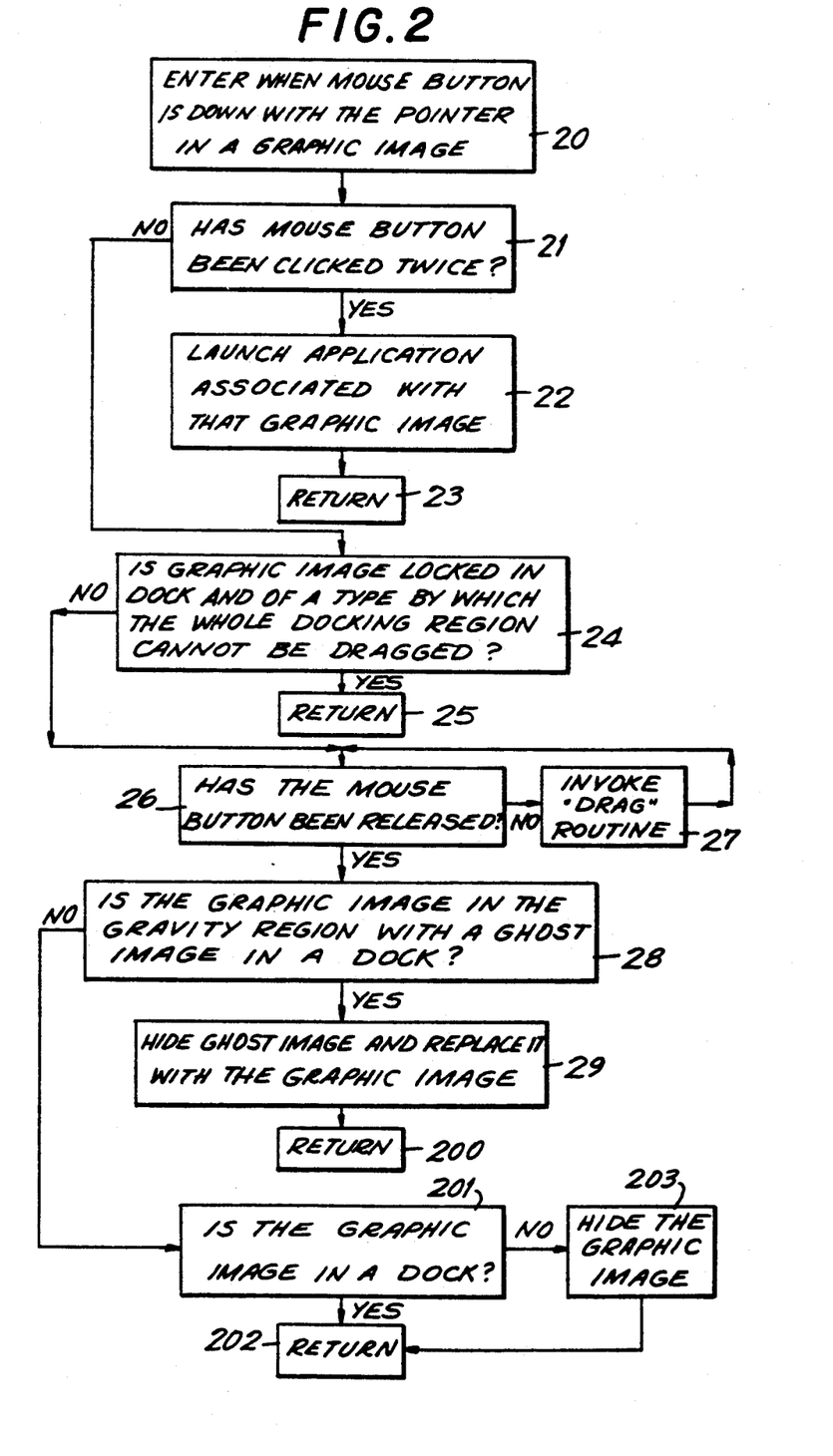
FIG. 2 is a flow diagram of a portion of a process implemented by the system and method of the invention when a user attempts to move a graphic image representing an application program.

FIG. 2 is a flow diagram of a routine (hereinafter referred to as the "mouseDown" routine), which is invoked, at step 20, each time a user presses a mouse button with pointer 100 in the graphic image of an application program. At step 21, the system tests to see if the mouse button has been pressed twice in rapid succession. If so, the application program associated with the graphic image is initiated at step 22 and the "mouseDown" routine ends at step 23. It is a common feature of graphic interface systems to initiate applications in this way. If there has been only a single press of the mouse button, the system proceeds to step 24, where it tests to see if the graphic image is in a dock and locked there and that it also is of a type by which the entire docking region 17 cannot be dragged. (As discussed above, in the preferred embodiment it is possible to move the entire docking region 17 by moving certain locked graphic images.) If it is, the "mouseDown" routine ends at step 25. Otherwise, the system proceeds to step 26 to test whether or not the mouse button has been released. If not, the "Drag" routine (described below) is invoked at step 27, and the system loops back to step 26. (Having reached step 27 from step 24, it is known that graphic image 19 is either not locked, in which case it can be moved by the "Drag" routine, or it is locked but is of a type by which the entire docking region 17 can be moved by the "Drag" routine.) If at step 26 the mouse button has been released, the system proceeds to step 28 to test whether or not graphic image 19 is within gravity region 18 with a ghost image 190 in a dock 170. If so, ghost image 190 is removed at step 29 and replaced by graphic image 19, and the "mouseDown" routine ends at step 200. Otherwise, the system tests at step 201 to see whether or not graphic image 19 is in a dock 170. If it is, it remains there and the "mouseDown" routine ends at step 202. Otherwise, graphic image 19 is not in a dock 170, and it has already been determined at step 28 that it is not within gravity region 18 with a ghost image 190 in a dock 170, so that it must be in free-dragging area 16. Therefore, graphic image 19 is hidden, or removed from display 10, at step 203, and the "mouseDown" routine ends at step 202.

Figure 3:
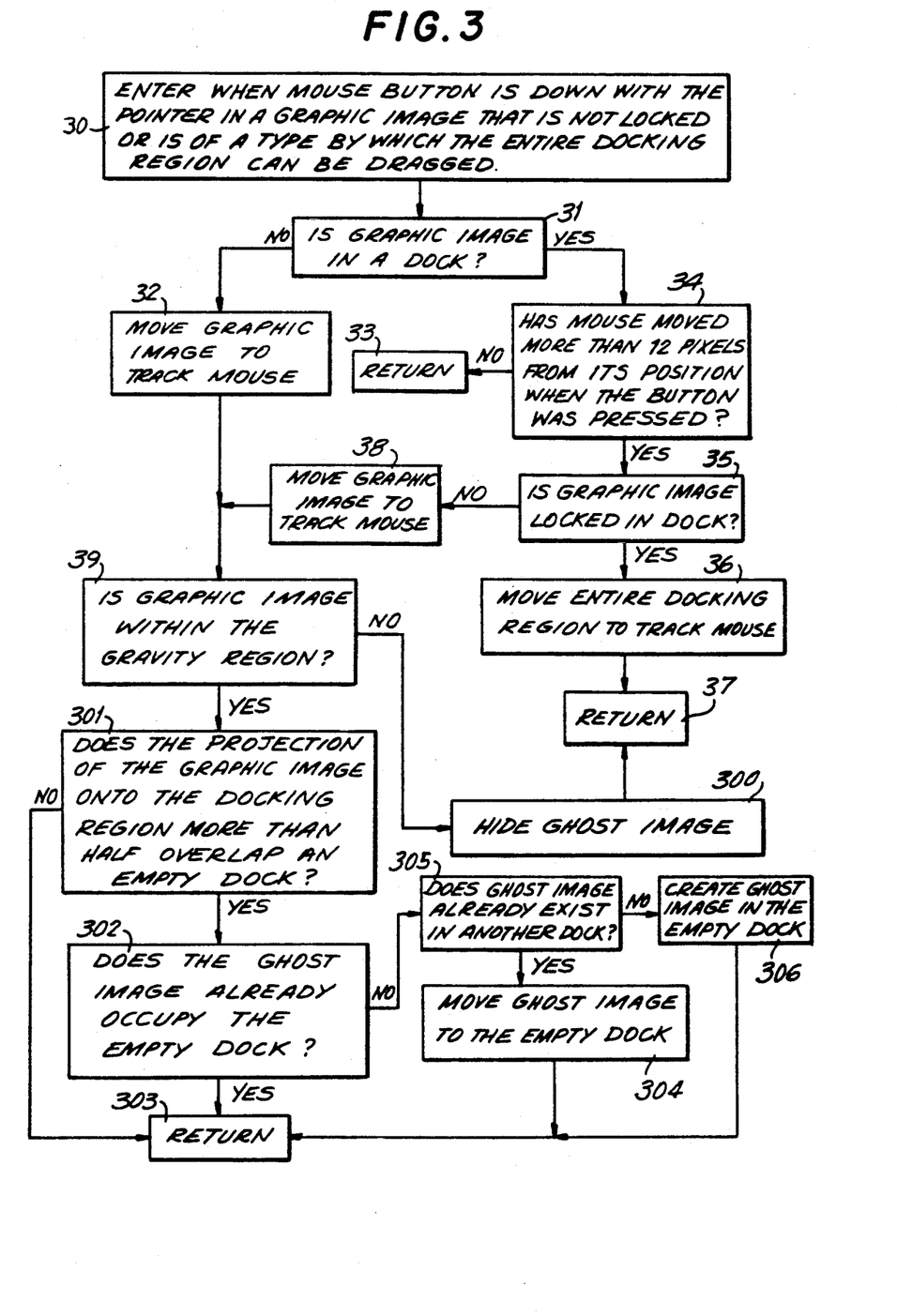
FIG. 3 is a flow diagram of a portion of another process implemented by the system and method of the invention when a user attempts to move a graphic image representing an application program.

FIG. 3 is a flow diagram of the "Drag" routine, referred to above, which is invoked at step 27 in FIG. 2. The routine is entered at step 30. At step 31, the system tests to see if graphic image 19 is in a dock 170. If graphic image 19 is not in a dock 170, it is moved at step 32 to the new position selected with the mouse, and the "Drag" routine continues with the test at step 39 (described below). If graphic image 19 is in a dock 170, then the system tests at step 34 to see if the pointer has been moved by the mouse more than 12 pixels (or any other predetermined number of pixels) from its location when the mouse button was first depressed. If not, the "Drag" routine ends at step 33. Otherwise, the system tests at step 35 to see if graphic image 19 is locked in dock 170.

If graphic image 19 is locked in dock 170, then the only way the "Drag" routine could have been entered in step 30 is if graphic image 19 is of a type (e.g., the operating system graphic image of the preferred embodiment, discussed above) by which the entire docking region 17 may be moved. Therefore, at step 36 the entire docking region 17 is moved to the new position selected with the mouse (subject to the limitation, discussed above, that docking region 17 cannot, in the preferred embodiment, be moved completely off display 10), and the "Drag" routine ends at step 37. If at step 35 graphic image 19 is not locked in dock 170, then at step 38 graphic image 19 is moved to the new position selected with the mouse. The system then tests at step 39 to see if graphic image 19 is within gravity region 18.

If graphic image 19 is not within gravity region 18, then ghost image 190 is removed from display 10 at step 300 and the "Drag" routine ends at step 37. If graphic image 19 is within gravity region 18, then at step 301 the system tests to see if the projection of graphic image 19 onto docking region 17 overlaps more than one half of an empty dock 170 (meaning, in the preferred embodiment, that if graphic image 19 were slid horizontally to docking region 17, the dock 170 to which it would be closest would be empty). If not, meaning that graphic image 19 is not opposite an empty dock, then the "Drag" routine ends at step 303, with no effect on the location of ghost image 190 (if graphic image 19 has just entered gravity region 18 and never had a ghost image 190, ghost image 190 would not be displayed; if graphic image 19 had already been in gravity region 18 and a ghost image 190 already occupied some dock 170, then ghost image 190 would remain in the dock it already occupied). If graphic image 19 is opposite an empty dock 170, then at step 302 the system tests to see if ghost image 190 already occupies that empty dock (graphic image 19 has not been moved that far). If ghost image 190 already occupies empty dock 170, then the "Drag" routine ends at step 303. If ghost image 190 does not already occupy empty dock 170, then at step 305 the system tests to see if ghost image 190 already exists in another dock 170. If so, then at step 304 ghost image 190 is moved to empty dock 170, and the "Drag" routine ends at step 303. Otherwise, at step 306 a ghost image 190 is created and displayed in empty dock 170, and the "Drag" routine ends at step 303.

HARDWARE SYSTEM

Figure 4:
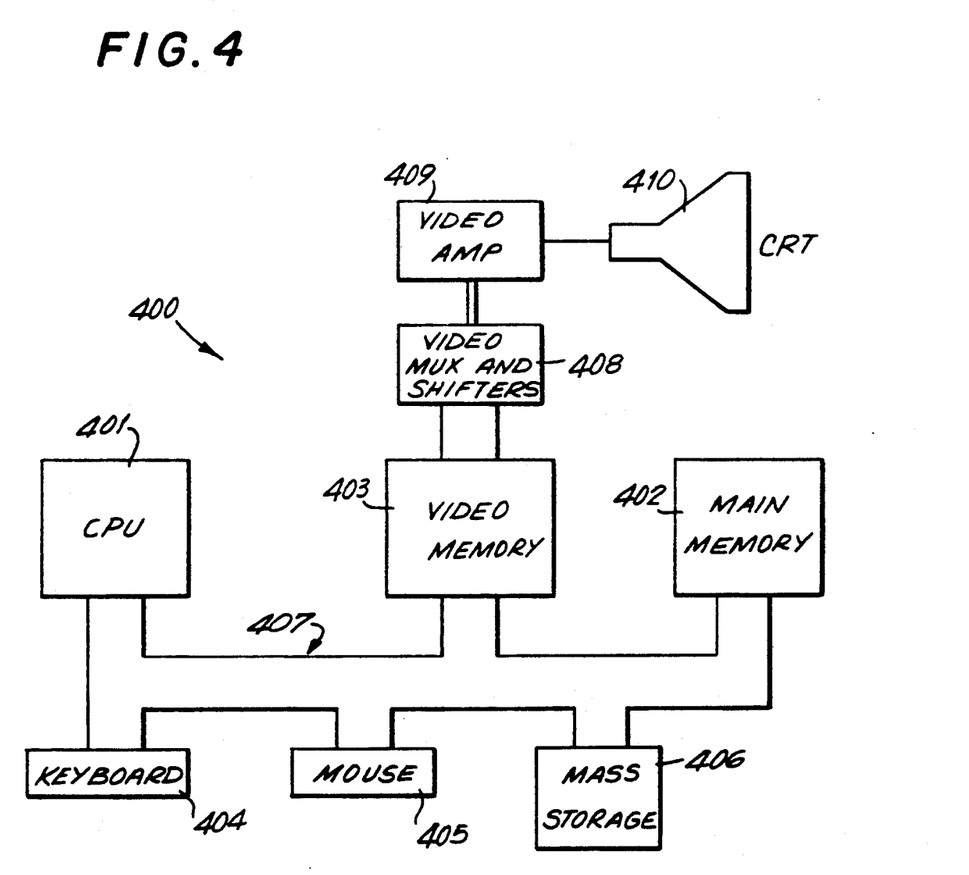
FIG. 4 is a block diagram of an exemplary hardware configuration for a computer on which the system and method of the invention are implemented.

While the present invention may advantageously be implemented on nearly any conventional computer system, an exemplary computer system 400 on which the present invention is implemented is shown in FIG. 4.

FIG. 4 shows a preferred embodiment of a hardware system 400 implementing the present invention as part of a computer system. In FIG. 4, system 400 includes CPU 401, main memory 402, video memory 403, a keyboard 404 for user input, supplemented by a conventional mouse 405 for manipulating graphic images according to the present invention, and mass storage 406 which may include both fixed and removable media using any one or more of magnetic, optical or magneto-optical storage technology or any other available mass storage technology. These components are interconnected via conventional bidirectional system bus 407. Bus 407 contains 32 address lines for addressing any portion of memory 402 and 403. System bus 407 also includes a 32 bit data bus for transferring data between and among CPU 401, main memory 402, video memory 403, and mass storage 406. In the preferred embodiment of system 400, CPU 401 is a Motorola 68030 32-bit microprocessor, but any other suitable microprocessor or microcomputer may alternatively be used. Detailed information about the 68030 microprocessor, in particular concerning its instruction set, bus structure, and control lines, is available from *MC68030 User's Manual*, published by Motorola Inc., of Phoenix, Ariz.

Main memory 402 of system 400 comprises eight megabytes of conventional dynamic random access memory, although more or less memory may suitably be used. Video memory 403 comprises 256K bytes of conventional dual-ported video random access memory. Again, depending on the resolution desired, more or less such memory may be used. Connected to a port of video memory 403 is video multiplex and shifter circuitry 408, to which in turn is connected video amplifier 409. Video amplifier 409 drives cathode-ray tube (CRT) raster monitor 410. Video multiplex and shifter circuitry 408 and video amplifier 409, which are conventional, convert pixel data stored in video memory 403 to raster signals suitable for use by monitor 410. Monitor 410 is of a type suitable for displaying graphic images having a resolution of 1120 pixels wide by 832 pixels high.

Thus it is seen that a graphic user interface for a computer is provided in which representations of loaded application programs can be placed on the display in a specified area reserved for such a purpose in which area they could not be so readily obscured and forgotten, and which includes a facility for controlling the placement of such representations within the reserved area. One skilled in the art will appreciate that the present invention can be practiced by other than the described embodiments, which are presented for purposes of illustration and not of limitation, and the present invention is limited only by the claims which follow.

What is claimed is:

1. In a computer system having a visual display on which graphic images are capable of being moved and released within boundaries of said display, a graphic image display control system comprising:
   means for moving said graphic images within at least a portion of said display within said boundaries;
   means for providing a parking region for said graphic images within said boundaries of said display;
   means for providing a retention field, distinct from said parking region, within said portion of said display within said boundaries; and
   means for automatically transferring one of said graphic images into said parking region when said one of said graphic images is released in said retention field.

2. The graphic image display control system of claim 1 wherein said means for automatically transferring said one of said graphic images into said parking region comprises:
   means for delineating within said parking region at least one receptacle for receiving said one of said graphic images; and
   means for transferring said one of said graphic images into an unoccupied one of said at least one receptacle.

3. The graphic image display control system of claim 2 wherein said means for automatically transferring said one of said graphic images into said parking region further comprises means for displaying a location of said unoccupied receptacle when said one of said graphic images, responsive to said moving means, is moved into said retention field.

4. The graphic image display control system of claim 3 wherein said means for automatically transferring said graphic image into said parking region inserts said graphic image into said displayed unoccupied receptacle.

5. The graphic image display control system of claim 2 wherein said transferring means transfers said graphic image into said unoccupied one of said at least one receptacle to which said graphic image is nearest.

6. The graphic image display control system of claim 1 further comprising means for preventing overlying, by at least some other images displayed on said visual display, of at least one of said graphic images in said parking region.

7. The graphic image display control system of claim 1 further comprising means for locking a graphic image into said parking region.

8. The graphic image display control system of claim 1 further comprising means for moving said parking region partially but not completely out of said boundaries of said display.

9. The graphic image display control system of claim 1 wherein said graphic images represent application programs that may be run on said computer system.

10. For use in a computer system having a visual display on which graphic images are capable of being moved and released within boundaries of said display, a graphic image display control method comprising the steps of:

moving said graphic images within at least a portion of said display within said boundaries;

providing a parking region for said graphic images within said boundaries of said display;

providing a retention field, distinct from said parking region, within said portion of said display within said boundaries; and automatically transferring one of said graphic images into said parking region when said one of said graphic images is released in said retention field.

11. The graphic image display control method of claim 10 wherein said step of automatically transferring said one of said graphic images into said parking region comprises the steps of:

delineating within said parking region at least one receptacle for receiving said one of said graphic images; and transferring said one of said graphic images into an unoccupied one of said at least one receptacle.

12. The graphic image display control method of claim 11 wherein said step of automatically transferring said one of said graphic images into said parking region further comprises displaying a location of said unoccupied receptacle when said one of said graphic images is moved into said retention field.

13. The graphic image display control method of claim 12 wherein said step of automatically transferring said graphic image into said parking region comprises automatically inserting said graphic image into said displayed unoccupied receptacle.

14. The graphic image display control method of claim 11 wherein said transferring step comprises transferring said graphic image into said unoccupied one of said at least one receptacle to which said graphic image is nearest.

15. The graphic image display control method of claim 10 further comprising preventing overlying, by at least some other images displayed on said visual display, of at least one of said graphic images in said parking region.

16. The graphic image display control method of claim 10 further comprising allowing the locking of a graphic image into said parking region.

17. The graphic image display control method of claim 10 further comprising allowing the movement of said parking region partially but not completely out of said boundaries of said display.

18. The graphic image display control method of claim 10 wherein said graphic images represent application programs that may be run on said computer system.

19. In a computer system having a visual display on which graphic images are capable of being moved on at least a portion of said display, a graphic image display system comprising:

a mouse for moving and releasing said graphic images on said display;

a parking region on said display;

a retention field, distinct from said parking region, in said portion of said display; and a programmed processor for automatically inserting one of said graphic images into said parking region when said one of said graphic images is released in said retention field.

20. The graphic image display system of claim 19 further comprising at least one receptacle within said parking region for receiving said one of said graphic images.

21. The graphic image display system of claim 20 wherein a location of an unoccupied receptacle is displayed when said one of said graphic images is moved into said retention field by said mouse.

22. The graphic image display system of claim 20 wherein said graphic image is automatically inserted into an unoccupied receptacle when said graphic image is released in said parking region.

23. The graphic image display system of claim 22 wherein said graphic image is automatically inserted into an unoccupied receptacle to which said graphic image is nearest.

24. The graphic image display system of claim 19 wherein at least one graphic image in said parking region is incapable of being overlaid by other graphic images displayed on said visual display.

25. The graphic image display system of claim 19 wherein a graphic image may be locked into said parking region.

26. The graphic image display system of claim 19 wherein said parking region may be moved partially but not completely out of said boundaries of said display.

27. The graphic image display system of claim 19 wherein said graphic images represent application programs that may be run on said computer system.

28. In a computer system having a visual display on which graphic images are capable of being moved and released within boundaries of said display, a graphic image display control system comprising:

means for moving said graphic images within at least a portion of said display within said boundaries;

means for providing a parking region within said boundaries of said display; and means for automatically transferring one of said graphic images into said parking region when said one of said graphic images is released in said portion of said display within said boundaries and outside said parking region.

29. The graphic image display control system of claim 28 wherein said means for automatically transferring said one of said graphic images into said parking region comprises:

means for delineating within said parking region at least one receptacle for receiving said one of said graphic images; and means for transferring said one of said graphic images into an unoccupied one of said at least one receptacle.

30. The graphic image display control system of claim 29 wherein said means for automatically transferring said one of said graphic images into said parking region further comprises means for displaying a location of said unoccupied receptacle when said one of said graphic images, responsive to said moving means, is moved into an area of said portion of said display from which said means for automatically transferring can automatically transfer said one of said graphic images into said parking region.

31. The graphic image display control system of claim 30 wherein said means for automatically transferring said graphic image into said parking region inserts said graphic image into said displayed unoccupied receptacle.

32. The graphic image display control system of claim 29 wherein said transferring means transfers said graphic image into an unoccupied one of said at least one receptacle to which said graphic image is nearest.

33. The graphic image display control system of claim 28 further comprising means for preventing overlying, by at least some other images displayed on said visual display, of at least one of said graphic images in said parking region.

34. The graphic image display control system of claim 28 further comprising means for locking a graphic image into said parking region.

35. The graphic image display control system of claim 28 further comprising means for moving said parking region partially but not completely out of said boundaries of said display.

36. The graphic image display control system of claim 28 wherein said graphic images represent application programs that may be run on said computer system.

37. For use in a computer system having a visual display on which graphic images are capable of being moved and released within boundaries of said display, a graphic image display control method comprising the steps of:

moving said graphic images within at least a portion of said boundaries of said display;

providing a parking region within said boundaries of said display; and automatically transferring one of said graphic images into said parking region when said one of said graphic images is released in said portion of said display within said boundaries and outside said parking region.

38. The graphic image display control method of claim 37 wherein said step of automatically transferring said one of said graphic images into said parking region comprises the steps of:

delineating within said parking region at least one receptacle for receiving said one of said graphic images; and transferring said one of said graphic images into an unoccupied one of said at least one receptacle.

39. The graphic image display control method of claim 38 wherein said step of automatically transferring said one of said graphic images into said parking region further comprises displaying a location of said unoccupied receptacle when said one of said graphic images, responsive to said moving means, is moved into an area of said portion of said display from which said one of said graphic images can be automatically transferred into said parking region.

40. The graphic image display control method of claim 39 wherein said step of automatically transferring said graphic image into said parking region comprises automatically inserting said graphic image into said displayed unoccupied receptacle.

41. The graphic image display control method of claim 38 wherein said transferring step comprises transferring said graphic image into an unoccupied one of said at least one receptacle to which said graphic image is nearest.

42. The graphic image display control method of claim 37 further comprising preventing overlying, by at least some other images displayed on said visual display, of at least one of said graphic images in said parking region.

43. The graphic image display control method of claim 37 further comprising locking a graphic image into said parking region.

44. The graphic image display control method of claim 37 further comprising allowing the movement of said parking region partially but not completely out of said boundaries of said display.

45. The graphic image display control method of claim 37 wherein said graphic images represent application programs that may be run on said computer system.

46. In a computer system having a visual display on which graphic images are capable of being moved on at least a portion of said display, a graphic image display system comprising:

a mouse for moving and releasing said graphic images on said display;

a parking region on said display; and a programmed processor for automatically inserting one of said graphic images into said parking region when said one of said graphic images is released in said portion of said display within said boundaries and outside said parking region.

47. The graphic image display system of claim 46 further comprising at least one receptacle within said parking region for receiving said one of said graphic images.

48. The graphic image display system of claim 47 wherein a location of an unoccupied receptacle is displayed when said one of said graphic images is moved by said mouse into an area of said portion of said display from which said programmed processor can automatically insert said one of said graphic images into said parking region.

49. The graphic image display system of claim 47 wherein said graphic image is automatically inserted into an unoccupied receptacle when said graphic image is released in said parking region.

50. The graphic image display system of claim 47 wherein said one of said graphic images is automatically inserted into an unoccupied one of said at least one receptacle to which said one of said graphic images is nearest.

51. The graphic image display system of claim 46 wherein at least one graphic image in said parking region is incapable of being overlaid by other graphic images displayed on said visual display.

52. The graphic image display system of claim 46 wherein a graphic image may be locked into said parking region.

53. The graphic image display system of claim 46 wherein said parking region may be moved partially but not completely out of said boundaries of said display.

54. The graphic image display system of claim 46 wherein said graphic images represent application programs that may be run on said computer system.

* * * * *